United States Patent
Seitz, Jr. et al.

(10) Patent No.: US 10,343,504 B1
(45) Date of Patent: Jul. 9, 2019

(54) PORTABLE RAIN AND SUN SHIELD FOR A COVERED GOLF CART

(71) Applicant: SWIC, LLC, Virginia Beach, VA (US)

(72) Inventors: Thomas M. Seitz, Jr., Virginia Beach, VA (US); Michael E. Walker, Virginia Beach, VA (US); Philip C. Hollowell, Virginia Beach, VA (US)

(73) Assignee: SWIC, LLC, Virginia Beach, VA (US)

( * ) Notice: Subject to any disclaimer, the term of this patent is extended or adjusted under 35 U.S.C. 154(b) by 0 days.

(21) Appl. No.: 16/194,186

(22) Filed: Nov. 16, 2018

Related U.S. Application Data

(60) Division of application No. 16/125,125, filed on Sep. 7, 2018, now Pat. No. 10,160,298, which is a continuation-in-part of application No. 15/879,943, filed on Jan. 25, 2018, now Pat. No. 10,093,161.

(51) Int. Cl.
*B60J 7/14* (2006.01)

(52) U.S. Cl.
CPC ........... *B60J 7/143* (2013.01); *B60Y 2200/86* (2013.01)

(58) Field of Classification Search
CPC .. B60J 7/143; B60J 11/08; B60J 11/00; B60Y 2200/86
USPC ...................................................... 135/88.07
See application file for complete search history.

(56) References Cited

U.S. PATENT DOCUMENTS

| | | | | |
|---|---|---|---|---|
| 1,425,954 A | * | 8/1922 | Fischer | E05B 77/00 160/DIG. 4 |
| 3,205,000 A | * | 9/1965 | Francis | B60J 11/08 160/370.21 |
| 3,348,875 A | * | 10/1967 | Francis | B60J 11/08 160/370.21 |
| 3,957,301 A | * | 5/1976 | Huber | B60J 11/00 296/95.1 |
| 6,782,904 B2 | * | 8/2004 | Tien | B60J 11/00 135/88.01 |
| 7,344,182 B1 | * | 3/2008 | Weddell | E04F 10/0633 160/67 |
| 7,641,259 B2 | * | 1/2010 | Teshima | B60J 5/0494 135/88.07 |
| 8,662,563 B1 | * | 3/2014 | Hardenbrook | E04H 15/08 135/88.07 |
| 8,845,004 B2 | * | 9/2014 | DeVoss, Jr. | B60J 11/00 296/99.1 |

FOREIGN PATENT DOCUMENTS

| | | | |
|---|---|---|---|
| CH | 624347 A5 | * | 7/1981 |
| DE | 19524806 A1 | * | 1/1997 |

\* cited by examiner

*Primary Examiner* — Noah Chandler Hawk
(74) *Attorney, Agent, or Firm* — Kelly J. Hollowell; Coastal IP LLC

(57) ABSTRACT

A rain and sun shield for a covered golf cart semi-permanently attached to the roof of a golf cart. The idevice is easy to install; will retrofit to any standard golf cart roof; does not interfere with the parking and storing profile of a fleet of golf carts. The device is easily opened and closed to provide the golf cart user with added sun and rain protection when in use.

8 Claims, 16 Drawing Sheets

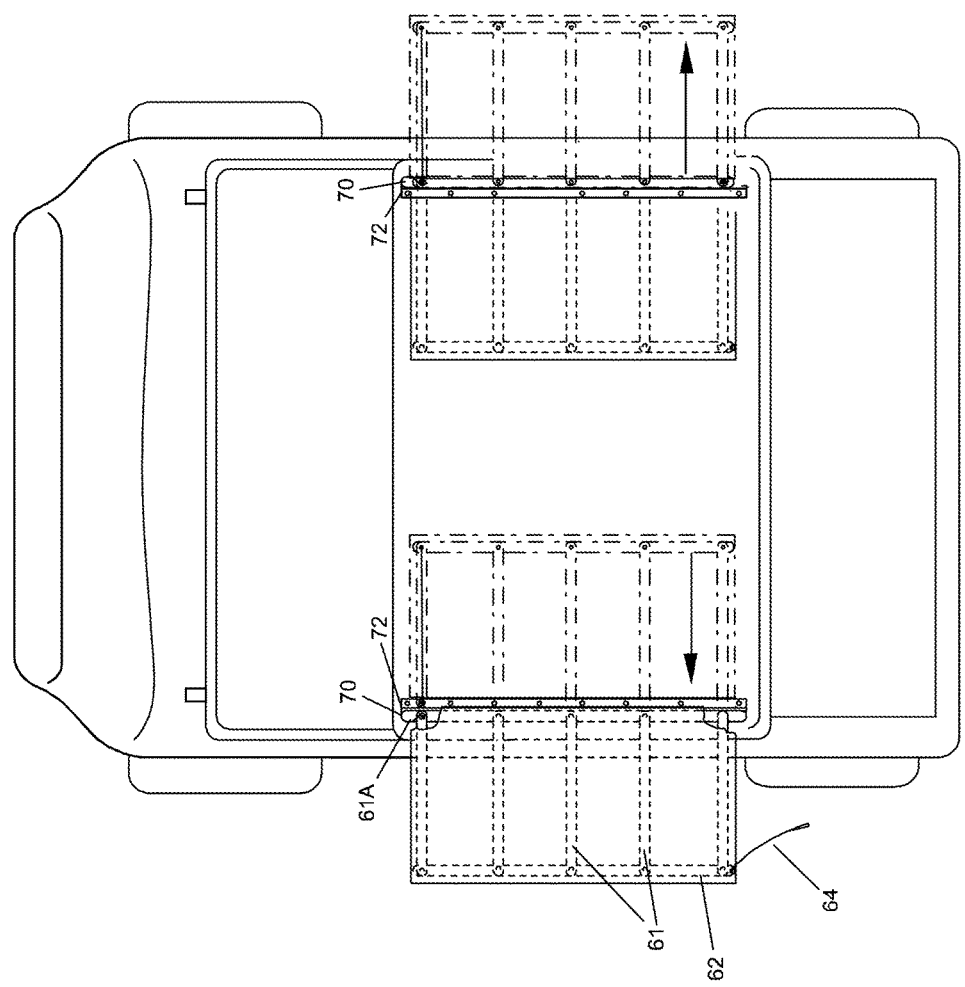

PORTABLE RAIN AND SUN SHIELD FOR A COVERED GOLF CART

CROSS-REFERENCE TO RELATED APPLICATIONS

This application claims priority to and is a divisional application of U.S. patent application Ser. No. 16/125,125, filed Sep. 9, 2018, which is a continuation-in-part application of U.S. patent application Ser. No. 15/879,943 filed Jan. 25, 2018, the contents of which are incorporated in their entirety herein by reference.

BACKGROUND

Golf carts, even covered golf carts, do not provide adequate protection to their occupants against sun and rain. Some after-market products have panels that drop down to cover the sides of a cart and others form a canopy covering the entire cart. These devices are often cumbersome and interfere with ingress to and egress from the golf cart. In addition, most of these devices are hard to install, interfere with the parking profile of the golf cart when it is stored and cannot be easily used in standard golf cart paths that wind through trees and large shrubbery.

In a related application, U.S. patent application Ser. No. 15/879,943 which is herein incorporated by reference, the invention is a light weight, portable and self-supporting rain and sun shield that can be fastened to the roof of a golf cart that includes an awning or canopy wider than the golf cart that will not interfere with the golfer's ingress to and egress from a golf cart but still offers protection from sun and rain overhead as well as sideways sun and rain for golfers sitting in the cart. This previously disclosed embodiment is portable, easily attached to and removed from a golf cart and conveniently fits in the umbrella pocket of a golf bag.

The previously disclosed device is a portable, lightweight sun and rain shield that is placed on top of a golf cart and is supported by a main support rod that rests on the roof of the golf cart parallel to the length of the golf cart. The main support rod is held in place using stabilizing bars and straps that hold the device against the roof of the golf cart. In one embodiment, the device has accordion-like extension arms that are in multiple segments to easily expand away in a perpendicular direction away from the main support rod across the width of the golf cart's roof. In one embodiment, the extension arm segments include an inner segment, an outer segment and a perimeter support rod segment. The outer segments of the extension arms are connected to the perimeter support rod segment on each side of the golf cart for at least two extension arms and are parallel to the main support rod. The perimeter support rod forms the outside perimeter and frame support for the device and cover. In one position the arms extend to the golf cart roofline on each side of the golf cart. In another embodiment, the arms extend beyond the width of the golf cart's roof as much as 120 inches. A nylon or fabric cover is attached to the main support rod, extension arms and perimeter support rods so that when the arms are fully extended the device provides golfers in the cart a shield from sun and rain. In one embodiment, the cover is attached to the main support rod, extension arms and perimeter support rods by fasteners, rivets, sewn sleeves, Velcro, hooks, snaps, loop and fasteners, ties, and other such fasteners as known in the art.

The previously disclosed device is easily retractable. The accordion-like extension arms retract adjacent to the main support rod by pivoting the extension arms into a position parallel with the length of the main support rod. The cover folds or crumples inward with the extension arms. The straps and fasteners can be used to secure the device in its collapsed position, and the collapsed or unexpanded device is approximately the same diameter and length as a large golf umbrella so that it fits in the umbrella slot, pouch, compartment, holder, or pocket of a standard golf bag. In one embodiment, the unexpanded device has a diameter of between 2 and 3.5 inches. In one embodiment, the cover extends at least 18 inches beyond each side of the golf cart. In another embodiment, the cover extends at least 24 inches beyond each side of the golf cart. In one embodiment, the cover is angled from the main support rod downward toward each side of the golf cart so that water will drain away from the main support rod. Other embodiments can include a carrying bag equipped with a shoulder strap, golf bag mounting clip, Velcro strap or other suitable attachment for mounting on or connecting to a golf bag while not installed on the golf cart.

What is needed is a rain and sun shield for a covered golf cart that is semi-permanently attached to the roof of a golf cart; that is easy to install; will retrofit to any standard golf cart roof; that does not interfere with the parking and storing profile of a fleet of golf carts and is easily opened and closed to provide the golf cart user with added sun and rain protection when in use.

SUMMARY

Herein described are embodiments of the rain and sun shield for a covered golf cart that are semi-permanently attached to the roof of the golf cart. The target market with these embodiments are users of golf carts as well as golf cart manufacturers and any entity that uses fleets of golf carts whether for golf courses, retirement communities or resort communities just to name a few. In summary, there are at least four primary embodiments of rain and sun shield devices for a covered golf carts that semi-permanently attached to the roof of a golf cart. These embodiemnts are easy to install; retrofit to any standard golf cart roof; and will not interfere with the parking and storing profile of a fleet of golf carts. In the embodiments, the devices attach to the golf cart roof such as by rivet or screws or other mechanical fasteners for a semi-permanent attachment.

The four primary embodiments can be used with any golf cart roof. The length of a two person golf cart roof from front to back is 60 inches and right to left 48 inches across. In one embodiment, two sets of panels each half the size of the golf cart roof are attached such as by hinges to a main support bar similar to the main support bar of the portable device. These two sets of panels lie stacked on each side of the golf cart support bar. The two sets of stacked panels are identical panel in size and shape. The bottom panel which is attached or hinged to the outer edge of the bottom panel. In the closed position, the two panels are stacked and locked down to the support bar. Once unlocked from the support bar the top panel flips open using a hinge mechanism to extend the top panel beyond the right and left sides of the golf cart roofline to provide the users of the golf cart added protection from the sun and rain.

In an alternate embodiment, rather than the stacked configuration using a hinge mechanism, the top panel is now inside the bottom panel so it can telescope out beyond the golf cart right and left side of the roof line. Alternatively, a single panel can be stowed in a housing cavity and simply slide out beyond the sides of the golf cart roof to provided added sun and rain protection. This embodiment may have a stop mechanism or latch to prevent the fully extended device from falling off. This embodiment makes use of rails to slide open and close the sun and rain shield.

In another embodiment, there are two main support bars or hinges semi-permanently attached to the golf cart roof. Each of the two main support bars or hinges is laid along the left and right perimeter of the golf cart and a single shield panel is attached to each support bar or hinge. In the locked or closed position the shield panel fits within half the frame of the golf cart roof. Once unlocked the panel flips 180 degrees over the support bar or hinge and extends beyond the side edges of the golf cart roof to provide sun and rain protection. Alternatively, multiple small hinges that attach semi-permanently to the golf cart roof can be used.

In a fourth embodiment, two main support bars and hinges are, once again, laid along the top face of the roof of the golf cart toward the outside perimeter of the right and left side of the golf cart roof. The sun and rain shield is comprised of a flexible material covering a plurality of rigid ribs having an interior side and an exterior side. The interior side of each rib is attached to the main support rod and or hinge and the exterior side of the rib is attached to a perimeter support rod using swivel pin joints that allow the ribs to rotate relative to each other and the main support and perimeter support rods. A flexible, opaque fabric covers the rib array to provide users added protection from sun and rain. In the closed position the shield is like a collapsed wing that is spring loaded and nested within the roof line of the golf cart. Once unlocked, the spring loaded shield opens into a rectangular shape that swings forward or backward in the shape of a parallelogram when it comes in contact with pressure or resistance such as from brushing against a tree. In other words, this embodiment is collapsible as the ribs that connect the main support bar and the outer support rod rotate on the swivel pins in both the forward and backward directions. Alternatively, the flexible shade panels can be attached on one edge to a long piano hinge or multiple small hinges attached on one side directly to the roof of the golf cart and on the other side to one of the main support bar such that the panels can be readily rotated 180 degrees over the hinge to rest the panels on the top of the roof when not in use.

In these embodiments, the device provides shelter to occupants of a golf cart from sun and rain when deployed on top of a golf cart. The device can shelter people standing or sitting next to a golf cart from sun and rain. In one embodiment, the device can be deployed on an ATV or other small transport vehicle instead of a golf cart. These and other advantages of the invention will be further understood and appreciated by those skilled in the art by reference to the following written specification, claims and appended drawings.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. Furthermore, the use of plurals can also refer to the singular, including without limitation when a term refers to one or more of a particular item; likewise, the use of a singular term can also include the plural, unless the context dictates otherwise. The terms "deployed", "extended", "open" and "in use" are used interchangeably and intended to have the same meaning as it related to the function and operation of the device. Similarly, the terms "undeployed" "unextended", closed, "stowed", "retracted" and "not in use", are used interchangeably and intended to have the same meaning as it related to the function and operation of the device. Finally, "panels" and "shield panels" are used interchangeably and intended to have the same meaning as it related to the function and operation of the device.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

It is to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise. Further, the invention presented herein may be described in terms of functional block components and processes, which may be realized in a variety of different forms to perform the specified functions and processes.

BRIEF DESCRIPTION OF DRAWINGS

FIG. 16 is a top view of an alternate folding embodiment of FIG. 13, wherein the flexible shade panels are attached to the golf cart using a 180-degree rotating hinge that is semi-permanently attached on one side directly to the roof of the golf cart and attached to the lower surface of the shade panels such that it can be folded over to be stowed on top of the roof of the cart when not in use.

DETAILED DESCRIPTION

Figure 1:
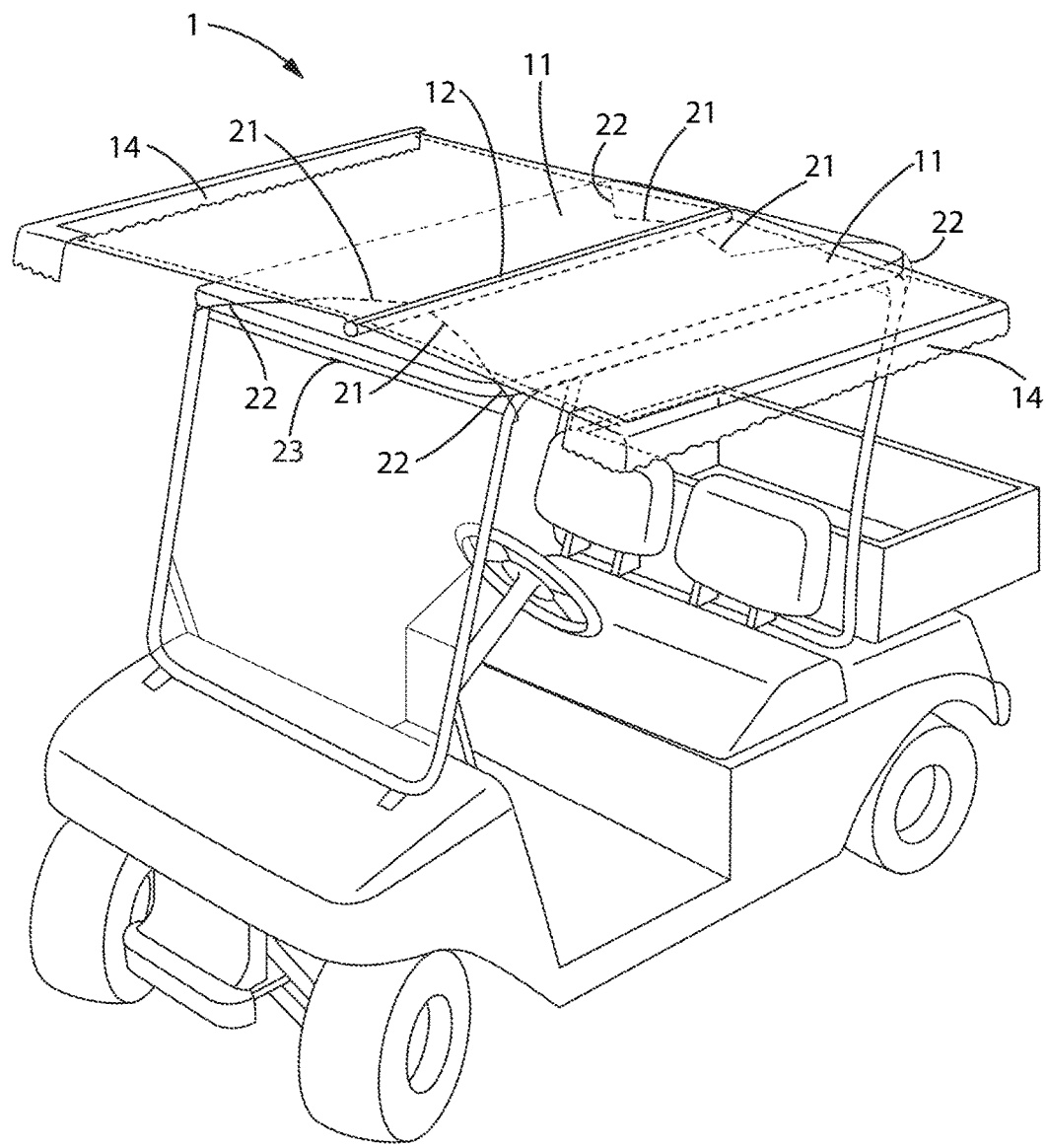
FIG. 1 is a perspective view of the extended portable device attached to a golf cart according to selected embodiments of the current disclosure.

In one embodiment, of the disclosed device 1, as shown in FIG. 1, the following components are employed: a removable cover 11 that provides the device's sun and rain protection; a main support rod 12; and a valance 14 that hangs down along the edges of cover 11. When positioned on a golf cart, the cover has arms that extend outward and wider than the sides of a golf cart and front and rear ends that can reversibly face in the direction of the front and rear end of the golf cart. The cover 11 can be of any material, such as canvas, nylon, polyester, cotton, linen, tencel, hemp, or any synthetic or natural fiber. In one embodiment, the cover material is treated to be waterproof. In another embodiment, the cover may be washable. In one embodiment, nylon or polyester is used because of its durability and low weight. In one embodiment, the cover 11 is a rectangle of approximately 84 to 96 inches wide from side to side and 44 inches long from front to back (with directional references based on the position of the cover when installed on a golf cart). The roof of a typical two seat golf cart is approximately 48 inches wide and 60 inches long. In one embodiment, of the device, the cover 11 is wide enough to extend 18 to 24 inches out from each side of the golf cart roof. In another embodiment, the cover 11 is up to 120 inches wider than each side of the golf cart's roof. In one embodiment, the cover 11 is between 42 and 46 inches long, the approximate length of a large golf umbrella. In another embodiment, the cover 11 is the approximate length of a golf cart's roof. The main support rod 12 can be a rod or pipe and can be made of metal, plastic, fiberglass, composite or other suitable light weight and strong material. The main support rod 12 can be held in place by straps, clamps, suction pads, suction cups or other suitable fasteners to hold the main support rod 12 from sliding on the roof of the golf cart.

The main support rod 12 bifurcates the width of the cover. In one embodiment; the main support rod 12 is located exactly halfway between the extending sides or width of the cover 11. In one embodiment, the extending ends of the cover 11 have a 0 to 12 inch valence 14 that hangs freely from the extending ends of the cover 11 to provide additional sun and rain protection to the golfers in the cart. In another embodiment, that portion of the cover 11 that extends out from the sides of the golf cart's roof also has a 0 to 12 inch valence that hangs down from the front and rear ends of the cover 11. In another embodiment, there is a 0 to 36 inch valence that hangs vertically from the outer perimeter of the cover. In one embodiment, the valence hangs vertically from the cover only along the sides of the cart. In another embodiment, the valence hangs vertically from the cover along the sides of the cart and partially along the front side of the cart. In another embodiment, the valence is attached to the cover along the entire perimeter of the cover.

Figure 2:
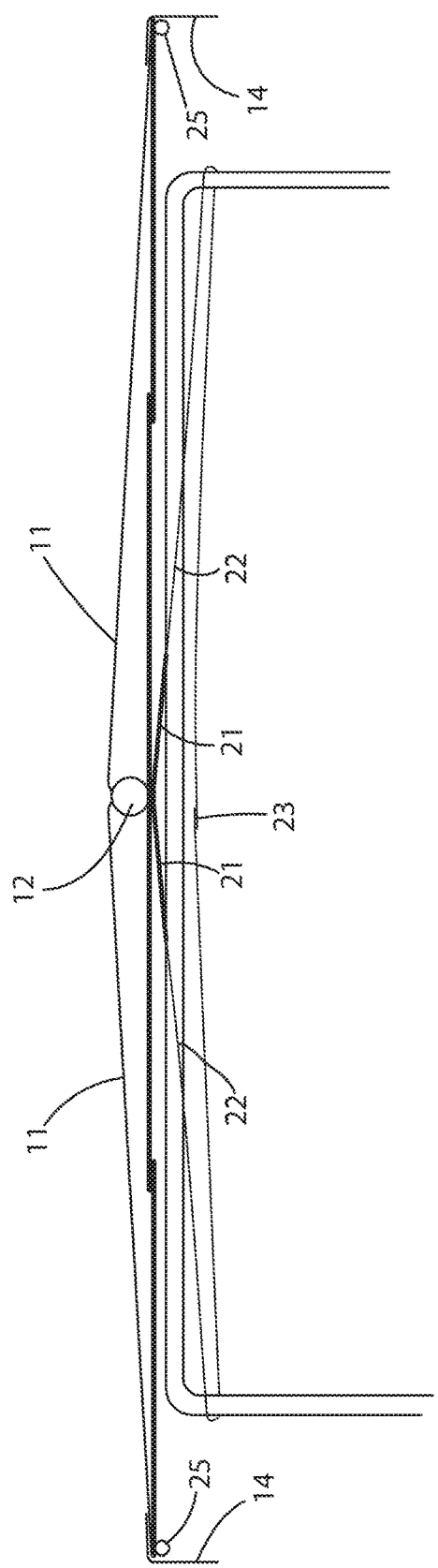
FIG. 2 is a rear plan view of the extended portable device according to selected embodiments of the current disclosure.

In one embodiment, of the disclosed device 1, as shown in FIG. 2, the following additional components are employed: stabilizer arms 21 supporting the main support rod 12; straps 22 attached to the stabilizer arms 21, the stabilizer arms 21 having one end attached to the main support rod 12 and an opposite end with Velcro, metal or plastic snap, plastic side release, metal slide/D-ring release or other suitable fasteners 23 on the straps 22 that connect the straps 22 together. In one embodiment, two stabilizer arms 21 are attached to main support rod 12 by a mechanical fastener such as but not limited to a screw, pin, pivot, bracket, swivel bracket or other connector 13. In one embodiment, the fastener for the stabilizer arms allows the stabilizer arms to rotate from a position parallel to the main support rod to a position perpendicular to the main support rod. Each stabilizer arm 21 is attached at one end to the connector 13 in such a way that the stabilizer arms can rotate at least 90 degrees on the connector 13. In another embodiment, at least one stabilizer arm 21 is attached to the main support rod 12 at each connector 13, each stabilizer arm 21 being attached at its center to the connector 13. In one embodiment, the device has four stabilizer arms; two on each side of the main support rod connected to the main support rod which is the center point of the stabilizer arms. One end of each of the four stabilizer arms 21 are attached to the main support rod by rotatable mechanical fasteners 13. In an embodiment with three connectors, six stabilizer arms can be used. In one embodiment, the device has two stabilizer arms 21, and each stabilizer arm 21 connects approximately halfway down its length to connector 13. In such an embodiment, each arm rotates around the connector 13. In another embodiment, the device uses a non-swivel bracket that allows the stabilizer arms to rotate without moving the bracket. In another embodiment, the device uses an attachment that is not a bracket to connect the stabilizer arms to the main support rod.

Figure 3:
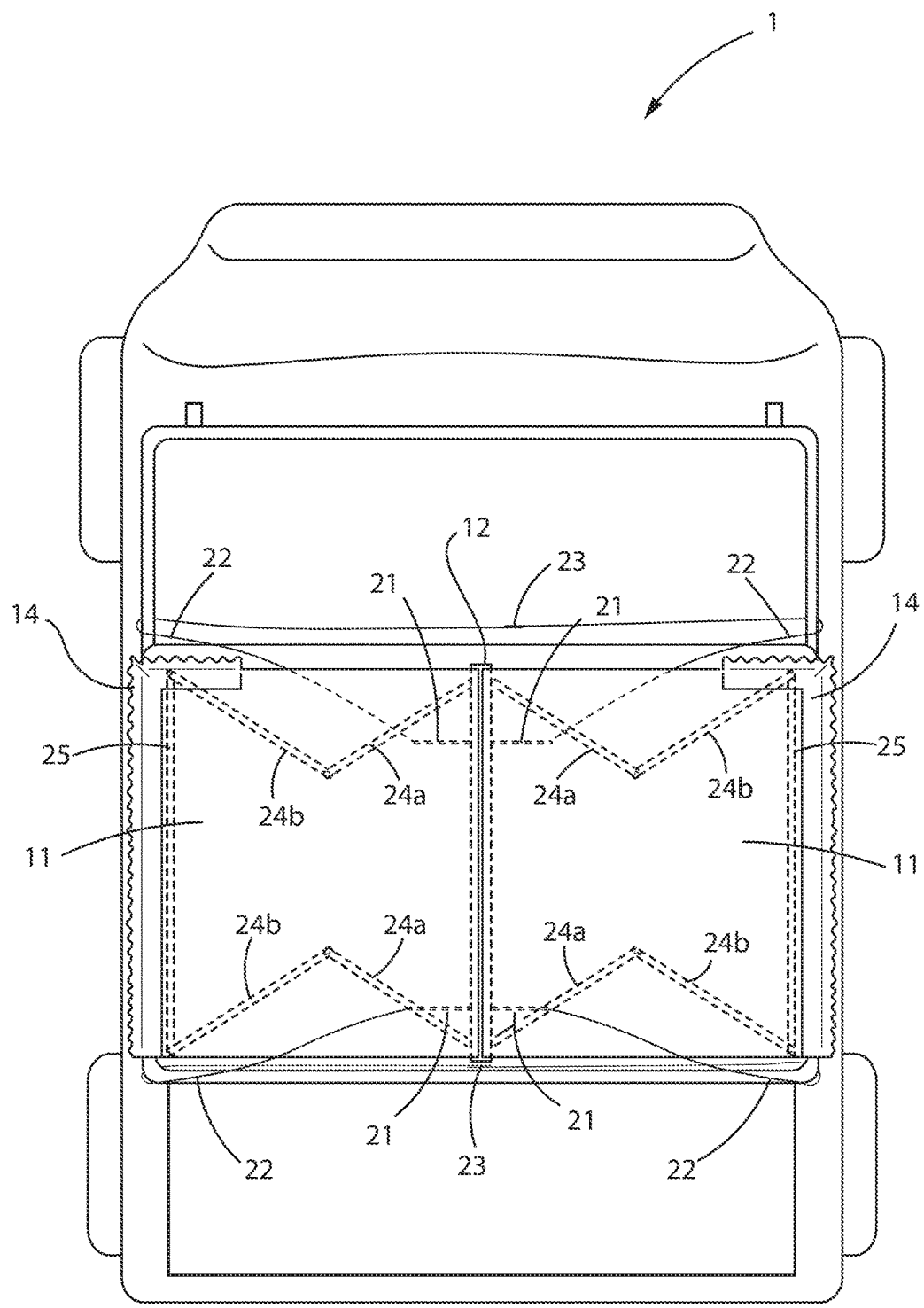
FIG. 3 is a top plan view of the partially retracted portable device according to selected embodiments of the current disclosure.

In the embodiment of FIG. 3, accordion-like extension arms 24 also attach to the main support rod 12 using fasteners similar those used to attach the stabilizer arms to the main support rod. In one embodiment, these are mechanical fasteners such as but not limited to hinge pins with retaining rings, screws, pins, pivots, brackets, swivel brackets generally referred to as connectors 15. In one embodiment, the accordion-like extension arms 24 attach to the same connectors (not shown) on the main support rod 12 as the stabilizer arms 21. Each extension arm 24 is made of a light weight but strong rod or pipe that is generally of a smaller diameter than the main support rod 12. In one embodiment, two extension arms 24 attach to each connector 15 and extend in opposite directions. In such an embodiment, the extension arms have an inner 24a, an outer 24b segment, and a perimeter support rod segment 25 each segment having a proximal and distal end; wherein the proximal end of the inner segment is attached to the lower side of the main support rod and the distal end of the inner segment 24a is connected to the proximal end of the outer segment 24b and the distal end of the outer segment 24b is connected to the perimeter support rod segment 25 for each of the at least two extension arms 24. The perimeter support rod segment 25 can attach to the outer segment 24b by a connector 26, which can be the same type of connector as connector 13, 15 or a different type of connector known to those of ordinary skill in the art. In another embodiment, a single extension arm (not shown) attaches to each connector 15 at the arm's center. In one embodiment, the extension arms 24 are the same diameter and construction as fiberglass tent poles. In another embodiment, the extension arms 24 are fiberglass tent poles. In one embodiment, the extension arms 24 attach to the main support rod 12 by bushings or bearing hinge pins or rivets. The cover 11 is attached using fasteners to the extension arms 24 so that the cover 11 becomes taut when the extension arms 24 are extended.

In one embodiment, the stabilizer arms 21 can, optionally, extend at an angle of between 10 and 25 degrees downward from the main support rod 12 to hold the main support rod 12 above the roof of the golf cart. In such an embodiment, this provides an angle to the cover so that, when extended, the highest point of the cover 11 is along the main support rod 12 causing water to drain out from the center of the cover to the sides of the golf cart.

In one embodiment, as shown in FIG. 2, the extension arms 24 are attached to the underside of the main support rod 12 while the cover is attached to the upper side (the opposite side) of the main support rod 12. This configuration also creates a pitch or angle to the top of the cover 11 so that water will drain away from the main support rod 12. This configuration also allows the extension arms 24 to be on a single plane so that they can fold and unfold easily. In another embodiment (not shown), the extension arms angle upward from the main support rod 12 or from the edge of the golf cart roof to allow additional standing clearance underneath the ends of the cover 11 overhanging the sides of the golf cart. In such an embodiment, the device would channel water toward the center of the cover 11 and off the back of the golf cart. In another embodiment, the device would channel water toward the perimeter support rod segment 25 which is configured to collect and direct water off either the back or front of the golf cart depending on the orientation of the device on the golf cart roof. In another embodiment, the perimeter support rod segment is configured as groove, half circle or gutter to channel water from the sides of the cart to the back or front of the cover.

As further shown in FIG. 2, each of the stabilizer arms has at least one strap 22 attached to it. The straps are of sufficient length to wrap around the sides of the golf cart roof and fasten together on the underside of the golf cart roof. In one embodiment, the straps are adjustable in length. In one embodiment, each strap 22 has a fastener on at least one end. In at least one embodiment, each strap 22 has a hook and loop closure on its loose end. Any type of fastener or attachment closure, such as Velcro, clips, or clip buckles, can be used on the straps 22 so long as the attachment closure can fasten the loose ends of the straps 22 together. In one embodiment, the stabilizer arms 13 can be held in place by straps, clamps, suction pads, suction cups or other suitable fasteners to keep the main support rod 12 from sliding away from the middle of the roof of the golf cart. In one embodiment, a single adjustable strap is attached to a single stabilizer arm on one end, wrapped around the golf cart roof and attached to the opposite of the single stabilizer arm (embodiment not shown).

Figure 4:
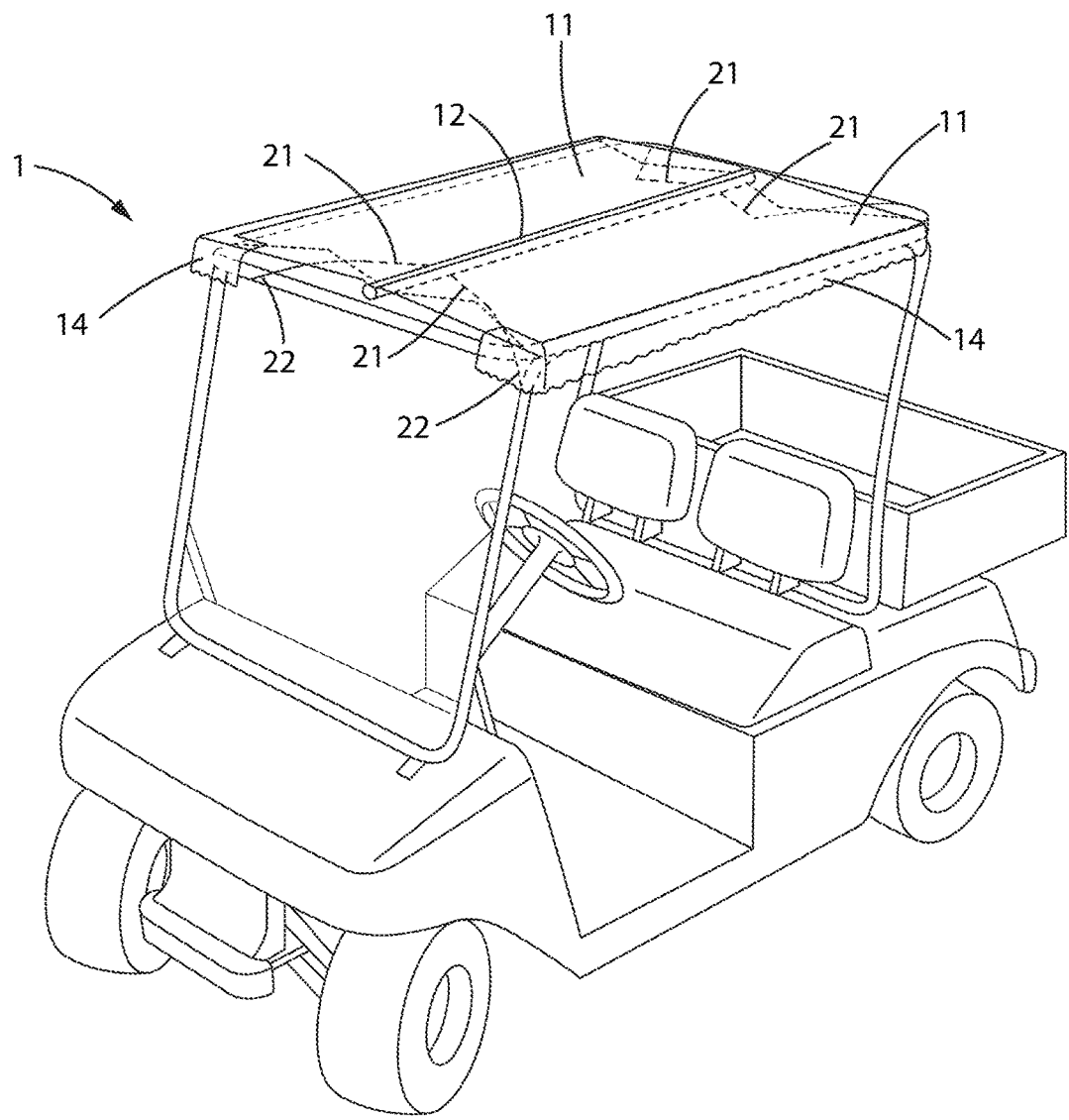
FIG. 4 is a perspective view of the partially extended portable device attached to a golf cart according to selected embodiments of the current disclosure.

As shown in FIG. 4, in one embodiment, the extension arms 24 can be extended partway so the cover does not hang over the sides of the cart or, in another embodiment, overhangs less than at full extension.

Figure 5:
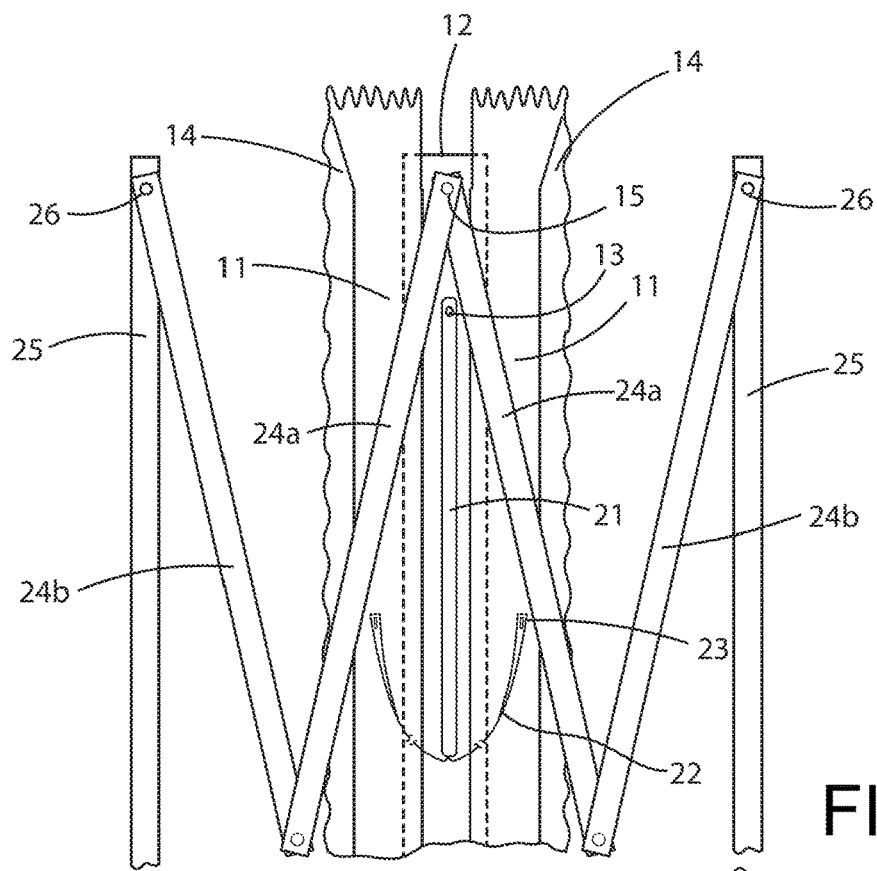
FIG. 5 is a top plan view of the portable device's main support bar and folded extension arms (without the cover) according to selected embodiments of the current disclosure.
Figure 5:
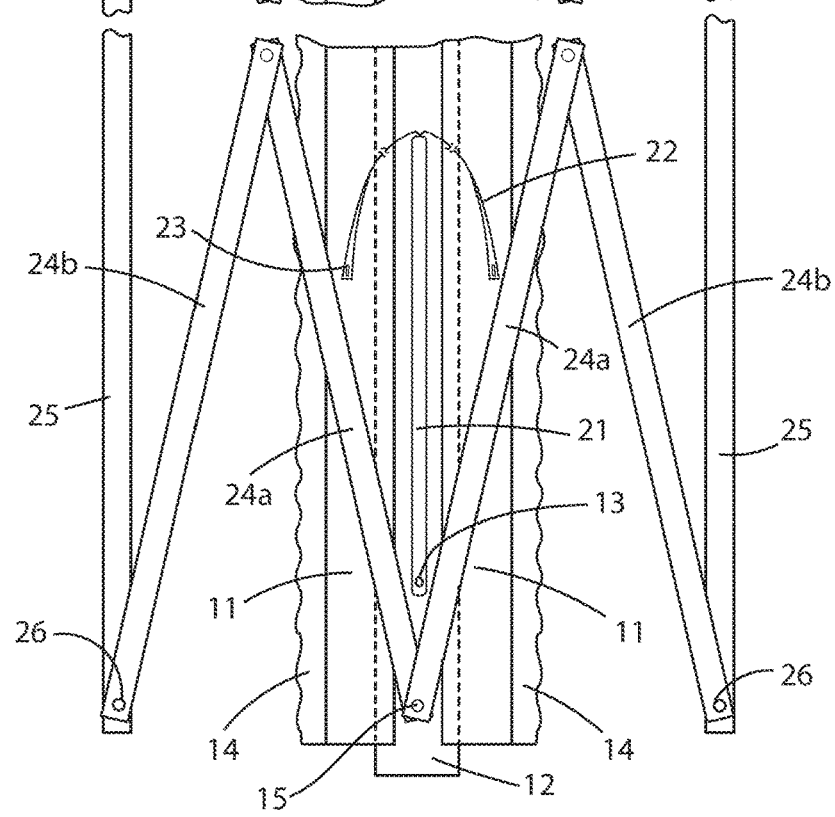

As shown in FIG. 5, in one embodiment, the cover 11 is held in place across the golf cart's roof by a main support rod 12 that is approximately the same length as the cover 11. In one embodiment, the main support rod 12 is longer than the cover 11. The main support rod 12 has at least two attachment points for stabilizer connectors 13. In one embodiment, the stabilizer connectors 13 are positioned toward the ends of the main support rod 12. One stabilizer connector 13 can be positioned toward the forward end of the main support rod 12 and a second stabilizer connector 13 is positioned between 6 inches and 24 inches from the rear end of the main support rod 12. In another embodiment, the stabilizer connectors 13 are positioned at an equal distance close to the ends of the main support rod 12 so the device has a universal front and rear orientation. The device can have stabilizer connectors 13 on the main support rod 12, which can rotate at the connectors 13 on main support rod 12 so that they are parallel to the main support rod 12 requiring less space for storage when the device 1 is removed from a golf cart.

In one embodiment, when the device is fully retracted it approximates the size of a large golf umbrella, having dimensions of approximately between 2 and 3.5 inches in diameter by approximately between 42 and 46 inches in length. In one embodiment, the device is designed to fit into the umbrella tube, slot, compartment or holder of a golf bag having a diameter of between 2 and 4 inches. In another embodiment, the device is between 0 and 144 inches in length to accommodate golf carts with a carrying capacity larger than two passengers.

The device is easy to deploy and use. The retracted device is placed on top of the roof of a golf cart. The stabilizer arms 21 are rotated to be perpendicular to the main support rod 12 and oriented underneath the main support rod 12. The main support rod 12 is placed on top of the golf cart's roof with the stabilizer arms 21 touching the roof. The main support rod 12 has a front end and a rear end. The front end of the main support rod 12 faces the general direction of the front of the golf cart and the rear end faces the general direction of the rear of the golf cart. The device can be positioned halfway between the sides of the roof of the golf cart (centered) and, in one embodiment, is supported by the stabilizer arms 21 so that the cover 11 only contacts the outside edge of the roof of the golf cart. When the device is positioned on the golf cart roof and is stabilized by the stabilizer arms 21, then the straps 22 are dropped over the sides of the golf cart's roof and passed underneath the golf cart's roof. The straps 22 connect to each other under the golf cart's roof by the fasteners 23 on the free ends of the straps 22.

In one embodiment, the free end of one strap 22 has both hook and loop Velcro portions on it and the end of the Velcro strap 22 passes through a looped end of the non-Velcro strap 22 on the opposite side of the roof. The Velcro strap 22 then folds on itself, fastened by the Velcro so that the two straps remain firmly attached to one another under the roof of the golf cart. In another embodiment, any suitable fastener can be used to attach the free ends of the straps 22 under the golf cart roof. For example, suitable fasteners can be buckles, side release buckles, magnetic release buckles, cams, cam buckles, strap adjusters, center release buckles, breakaway buckles, ratchets, ratchet joints, snaps, rivets, and clasps. In another embodiment (not shown), a strap having a looped end or other suitable fastener wraps under the golf cart roof and attaches to a hook or other corresponding fastener to hold the device securely to the golf cart roof.

Once the device is positioned and fastened to the golf cart roof, then the extension arms 24 can be lengthened until the cover is at the desired length or taut. In one embodiment, the extension arms 24 include a spring engaged locking mechanism to keep them in the extended position. In another embodiment, the locking mechanism has a push button ratchet joint that provides various locking positions so that the cover can be retracted and extended to various widths between fully retracted and fully extended, depending on user preference.

The device can be easily removed from a golf cart. In an embodiment with Velcro strap fasteners, extension arms 24 are fully retracted and the stabilizer arm 21 straps 22 are unfastened. Then the stabilizer arms 21 are rotated parallel with the main support rod 12 for storage. Once the cover 11 is completely retracted or crumpled to its fully retracted position (it will crumple for storage as the extension arms 24 retract), the straps can be wrapped around the retracted device to hold the cover 11, folded stabilizer arms 21, and folded extension arms 24 tightly against the main support rod 12. When fully retracted, the device can fit into a standard umbrella pocket on a golf bag for storage.

In one embodiment, the stabilizer arms 21 can be omitted to reduce the size and weight of the device. In another embodiment, the extension arms 24 and the stabilizer arms 21 can be of a unitary construction to reduce the number of moving parts on the device.

In another embodiment, the device can be semi-permanently fixed to the roof of a golf cart using mechanical fasteners such as but not limited to screws and bolts. In the semi-permanent embodiments, for example, the accordion like extensions of the portable device which is covered in light weight material can be used but alternatively replaced with hardtop extensions or flexible panels such as but not limited to a clam shell or flip top designs that when stowed fit within the frame of a golf cart roof but when open provide extended rain and sun protection to the golf cart users. Such embodiments would no longer fit in the umbrella pocket of a golf bag but are still considered portable as they can be attached or retrofit to any golf cart roof. They could remain on the golf cart roof or otherwise stored in close proximity to the golf carts themselves to attach as needed.

Figure 6:
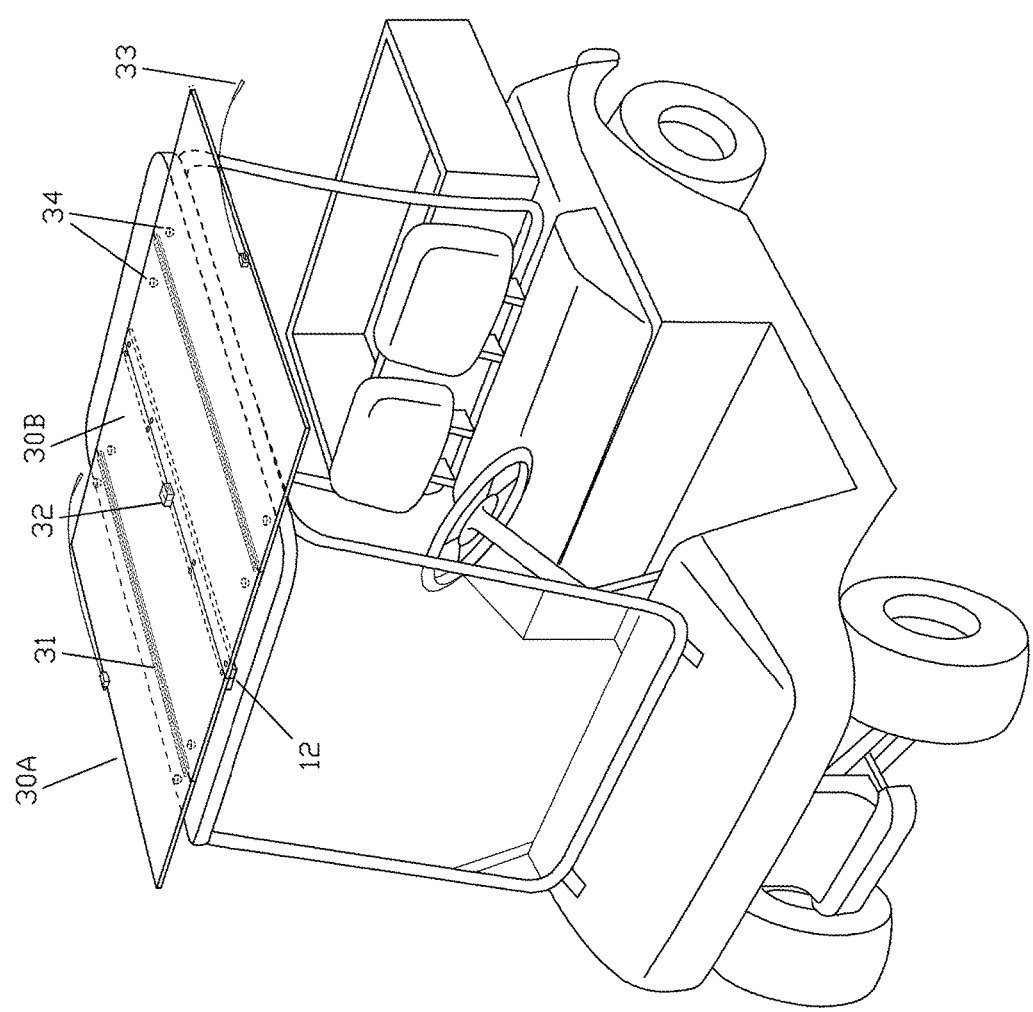
FIG. 6 is a perspective view of an alternate folding embodiment of a device semi-permanently attached to a golf cart.

In one embodiment shown in FIG. 6, the embodiment is comprised of two identical sets of panels 30A and 30B that are stacked when stored or not in use. To use or deploy the device the panels can be unfolded to provide the sun and rain shade for each side of the golf cart. The panels 30A and 30B can be made of lightweight waterproof material such as but not limited to plastic, high impact polyethylene, fiberglass, composite material or other suitable light weight, waterproof and strong material. One edge of panel 30B is affixed to the main support bar 12, which is securely attached to and extends along the center and top of the golf cart's roof from front to back of the golf cart roof. The other edge of panel 30B is attached to panel 30A using a flexible hinge 31. In the embodiment of FIG. 6, the two identical sets of panels 30A and 30B are connected to each other using, for example, a single flexible hinge that extends substantially along the joint between the panels. In an alternate embodiment, a plurality of smaller hinges is spaced-apart along the joining edges of the two panels. In the retracted position, panel 30A is folded back or stacked on top of panel 30B and remains secured to the main support bar such as by a central clasp 32. In the embodiment of FIG. 6, a single central clasp 32 is shown. In another embodiment, a clasp (not shown) is located on the front or rear edges of the main support bar or on the front edge of the golf cart roof for ease of accessing the clasps from the front and rear of the cart when deploying the panels in the extended position. The clasps can be any type of spring-loaded or non-spring-loaded mechanical or magnetic clasps known to those of ordinary skill in the art. In one embodiment a single central clasp can have multiple mating clasps attached to multiple panels to secure the panels in the closed position. A draw-line 33 is shown attached to a mating clasp for a single central clasp 32 which is attached to the outer edges of panels 30A to assist the user in deploying the panels to the extended position. In one embodiment, a plurality of flexible grommets 34 are spaced-apart near the hinges and attached to the side of panels 30A and 30B that come in contact with the roof of the golf cart to prevent the panels from directly contacting the topside of the golf cart roof either when the panels are retracted or extended to prevent scratching. The flexible grommets also provide stability, shock absorption, noise reduction and to cushion the panels as the golf cart moves across the terrain whether in the extended or retracted position. In one embodiment, the grommets 34 are symmetrically spaced apart. In another embodiment, the grommets 34 are asymmetrically spaced apart. In another embodiment, the grommets 34 are waterproof, weatherproof and made of material such as but not limited to rubber or plastic.

Figure 7:
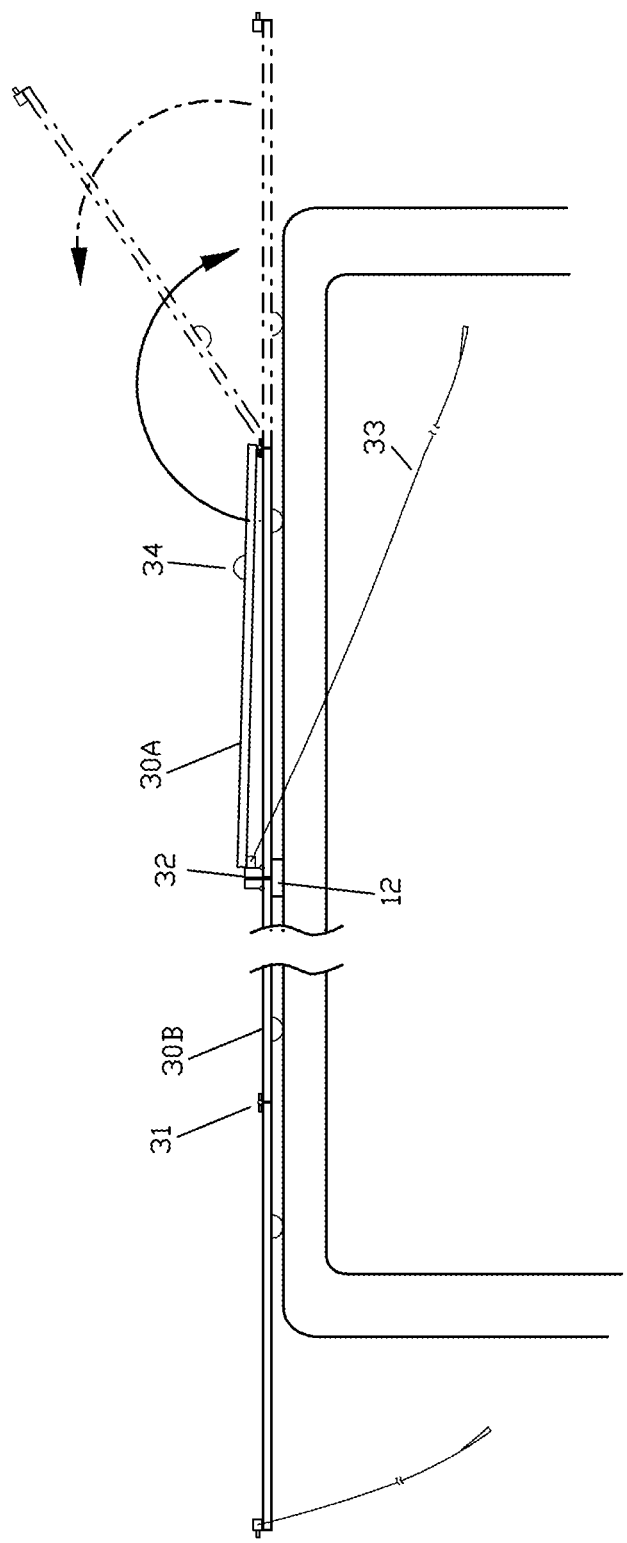
FIG. 7 is a front or rear side view of the embodiment shown in FIG. 6 attached to a golf cart roof with one side of the embodiment shown in the extended or open position and the other side in the retracted position with in dashed lines showing the movement of that one side to the extended position during use.

In reference to FIG. 7, one side of the embodiment of FIG. 6 is shown in the retracted position and secured to the main support bar 12 at the clasp 32. In dashed lines, the panel 30A is shown in the extended and partly extended position to show how the panel folds along the hinge 31 when being deployed or retracted. The embodiment of FIG. 6 shows the panels 30A and 30B are of the same width and length dimensions so that in the retracted position; the panels substantially overlap and contained within the perimeter of the golf cart roof. The width dimension of the panels is selected such that in the extended position, the panel 30A extends over the edge of the roof to the desired level. In one embodiment, the panels extend beyond the width of the golf cart roof up to 24 inches. In one embodiment, the panels extend beyond the width of the golf cart roof up to 120 inches.

Figure 8:
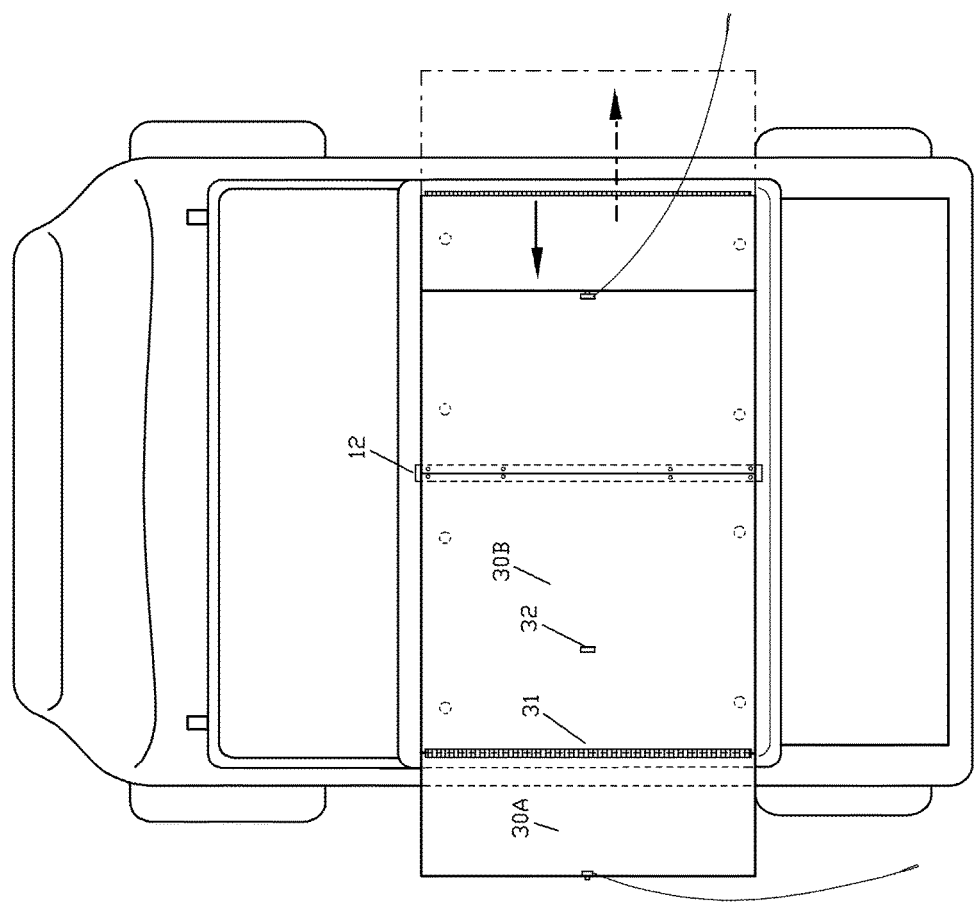
FIG. 8 is a top plan view of the embodiment of FIG. 6 showing one side of the device in the extended position on one side and the other side in the retracted position with dashed lines showing how that side would appear in the extended position when deployed or in use. The hinges of this embodiment are located closer to the edges of the cart's roof such that the shield panels are of different dimension than the roof panels.

In reference to FIG. 8, an alternate embodiment is shown where the hinge 31 is located closer to the left and right edges of the golf cart's roof. The width of panel 30A would only need to be sized to provide the extent of shading desired. In this embodiment, the width of panel 30B is larger than panel 30A since the additional width is necessary to reach the main support bar 12 that is attached to the center of the golf cart's roof. The securing clasps 32 are located closer to the center of panel 30B to match up with the mating clasps on the outer edges of panel 30A.

Figure 9:
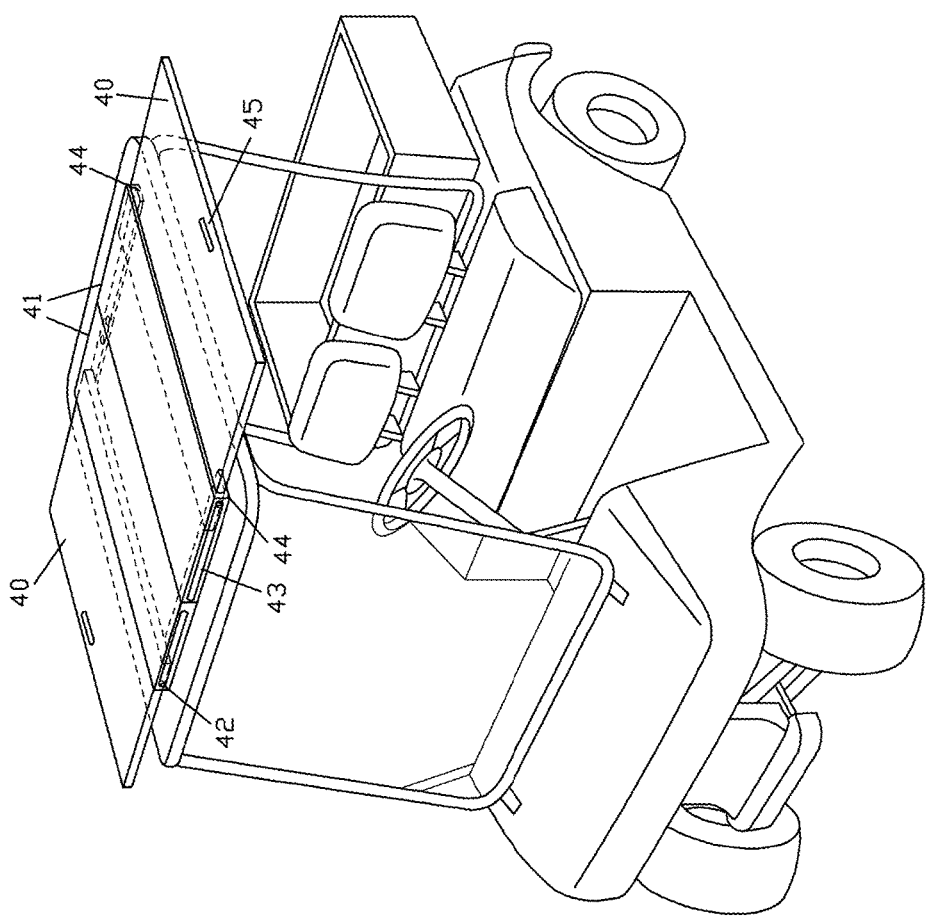
FIG. 9 is a perspective view of an alternate slide rail embodiment of the device semi-permanently attached to a golf cart.

In reference to FIG. 9, a telescoping or sliding embodiment of the current invention is shown. In this embodiment, panels 40 move horizontally relative to the plane of the golf cart's roof within housing cavities 41. Panels 40 have a proximal edge, and a perimeter edge. The panels 40 can be made of lightweight waterproof material such as but not limited to plastic, high impact polyethylene, fiberglass, composite material or other suitable light weight, waterproof and strong material. The housing cavities 41 may be secured centrally to the main support bar 12 or directly to the top surface of the golf cart roof. In the embodiment of FIG. 9, the top surface of the golf cart's roof forms the bottom of the housing cavities 41 so that essentially the housing cavity is an open frame to house the shield panels. In one embodiment, the housing cavities 41 are secured to lateral rails 44 that guide the panels 40 as they are extended and retracted; and the lateral rails 44 are located at the front and rear of the golf cart roof and secured to the main support bar 12 or alternatively semi-permanently attached directly to the top surface of the golf cart roof. Alternatively the lateral rails 44 are the front and rea side of the housing cavities 41 and are themselves semi-permanently attached to the roof of the golf cart. In another embodiment, the housing cavities are semi-permanently attached closer to the edges of the golf cart's roof to shorten the width of the panels 40 required to reach the desired level of rain and sun protection when extended.

A stop block alternatively called a retaining arm 42 is secured to panels 40 to prevent the panels from falling out of the housing cavities. In one embodiment, an arm guide 43 is notched out of the side edges of the housing cavity and the retaining arm 42 slides back and forth within the arm guide 43 to prevent the panels 40 from sliding out of the housing cavities when the panels are placed in the extended position. In one embodiment, a hand grip section 45 of the panels' 41 outer edges is made to provide a gripping point to extend and retract the panels from the housing cavities. However, any type of known handle design could be used to facilitate movement of the panels within the housing cavities. In other embodiments, known rail guides, such as those used for guiding cabinetry drawers could also be used to control the movement of the panels into and out of the housing cavities. In another embodiment the housing cavity comprises only the rails 44 themselves to hold the panels 40.

An alternate embodiment of FIG. 9 (not shown) provides for rain and sun shield device having a pair of housing cavities, each cavity having a rectangular shaped frame with an open top and bottom, a back, an open distal end and a set of lateral slide rails. The lateral side rails form the right and left sides of the cavities. In this embodiment, cavities are nested back to back within the limits of the golf cart roof. The cavities are semi-permanently attached to the upper surface of the golf cart roof and a pair of rectangular panels is inserted into each of the housing cavities. The panels can be manually deployed by a user so that the panels lie partly on the golf cart roof and extend beyond the right and left sides of the golf cart roof. In this embodiment, the device also has at least one pair of detachable retaining lines with two ends, whereby one end is permanently attached to the front edge of each panel and the other end is optionally, temporarily or as needed attached to an anchor point located on the front of a golf cart frame located below the cart roof to anchor the panels in the deployed position. In this embodiment the panels can be deployed up to about 24 inches past the right and left sides of the golf cart roof. In this embodiment, the device also has a retaining arm secured to each panel and located within an arm guide notched out of the inside and outside surfaces of the slide rails of each housing cavity and a central grip notch located near the perimeter edge of each panel. In this embodiment, the device also has a plurality of flexible grommets attached to the bottom surface of each of the panels, a wiper blade attached to the bottom proximal surface of each panel to keep rain from getting under the shield and draining at the sides of the golf cart roof; and a second anchor point located on the top front edge of the golf cart roof or slide rail with a mating clasp attached to the front edge of each panel.

Figure 10:
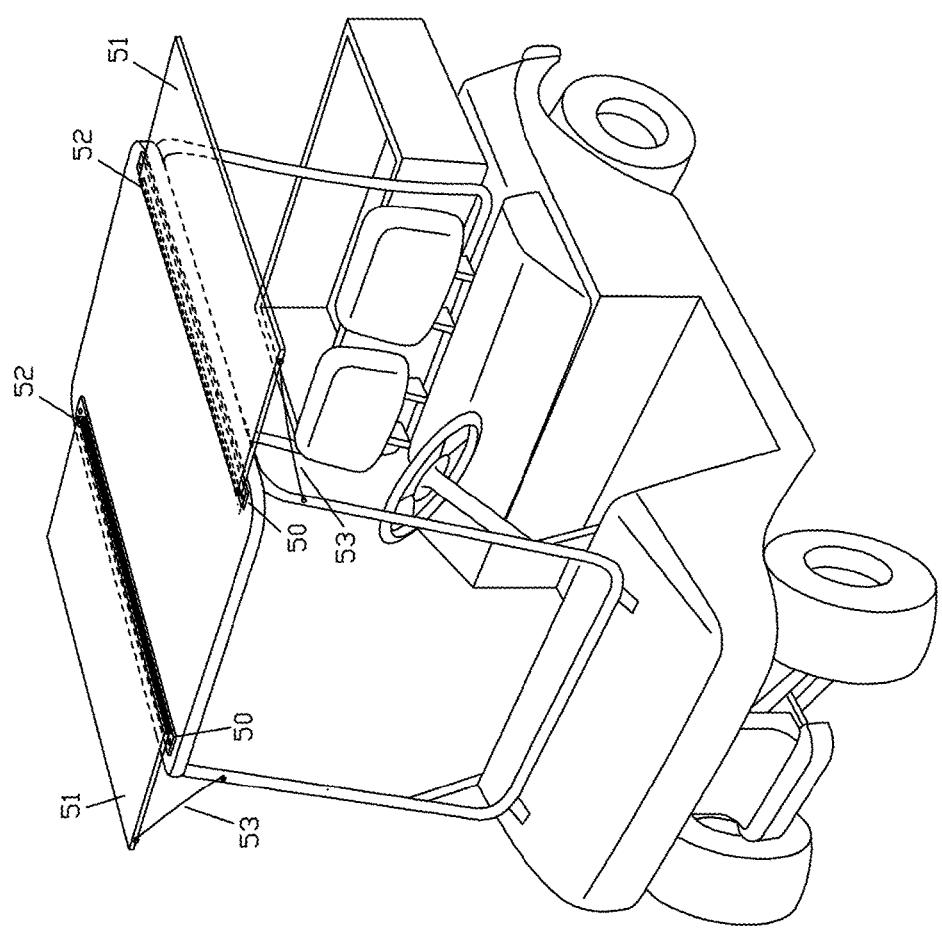
FIG. 10 is a perspective view of an alternate folding embodiment of the device semi-permanently attached to a golf cart using two main support bars.

In reference to FIG. 10, an alternate folding embodiment for the device is shown comprising two main support bars 50 are secured near to the left and right perimeter of the golf cart's roof. Each of the two shield panels 51 are attached on the inside edge to hinges 52. The other sides of the hinges 52 are secured to each of the two main support bars 50. In the embodiment, of FIG. 10, the hinges 52 are 180-degree piano hinges are shown that extend substantially along the inside edge of the panels 51. However, in other embodiments, a plurality of evenly-spaced apart smaller hinges is used. In the retracted position, the shield panels 51 fold about 180-degrees over the hinges 52 toward the central part of the top surface of the golf cart's roof. The panels 51 can be made of lightweight waterproof material such as but not limited to plastic, high impact polyethylene, fiberglass, composite material or other suitable light weight, waterproof and strong material. In one embodiment, a retaining line 53 is attached permanently on one end to the front edge of each shield panel 51. The other end of the retaining line 53 is optionally, temporarily or as needed is secured to the front of each forward cart frame at some distance below the cart's roof section at an anchor point 66 (shown in FIG. 13) to stabilize the panel when the golf cart is in use. In other embodiments, one side of the 180-degree hinges are semi-permanently attached directly to the top side of the golf cart's roof and do not require the two main support bars 50 extending along the side edges of the golf cart's roof. In one embodiment, grommets 34 (shown in FIG. 11) are placed along the full length of the panel front to back to prevent the panels 51 from having direct contact with the golf cart roof.

Figure 11:
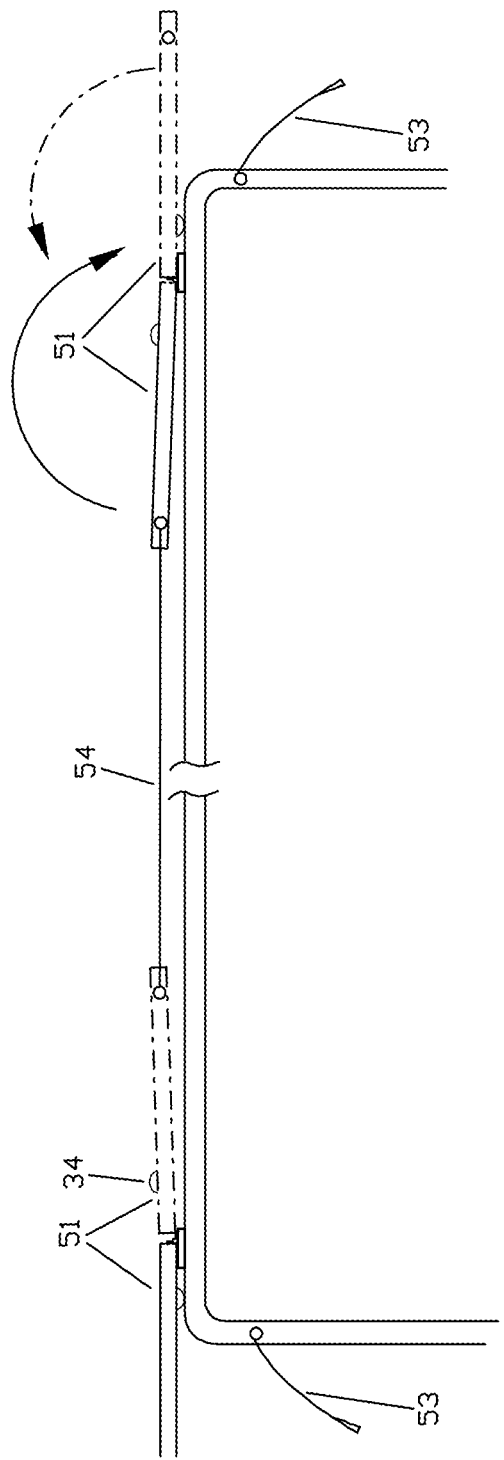
FIG. 11 is a front or rear side view of the embodiment in FIG. 10 attached to a golf cart roof with one side of the embodiment shown in the extended position and dashed lines showing that side in the retracted position. The other side is shown in the retracted position with dashed lines showing the movement and position of that side when extended for use.

In the reference to FIG. 11, a cross-sectional view of the embodiment of FIG. 10 is shown with the left side shield panel 51 in the extended position in solid line and having a dashed line showing the panel 51 in the retracted position. The right-side shield panel 51 is shown in solid line in the retracted position and having a dashed line showing the panel 51 in the extended position. Curved arrow lines show the movement of the shield panels 51 from the retracted to the extended position as they are rotated about their securing hinges 52. In one embodiment, one end of the retaining line 53 is permanently attached to the front edges of the shield panels when in the extended position. The second end of the retaining line 53 can be attached to one of several anchor points 66 such as the one shown in FIG. 13 on the golf cart frame to stabilize the panel when the golf cart is in use or moving. A second retaining line 54 attached to each panel can used to secure the shield panels 51 together when they are in the retracted position.

Figure 12:
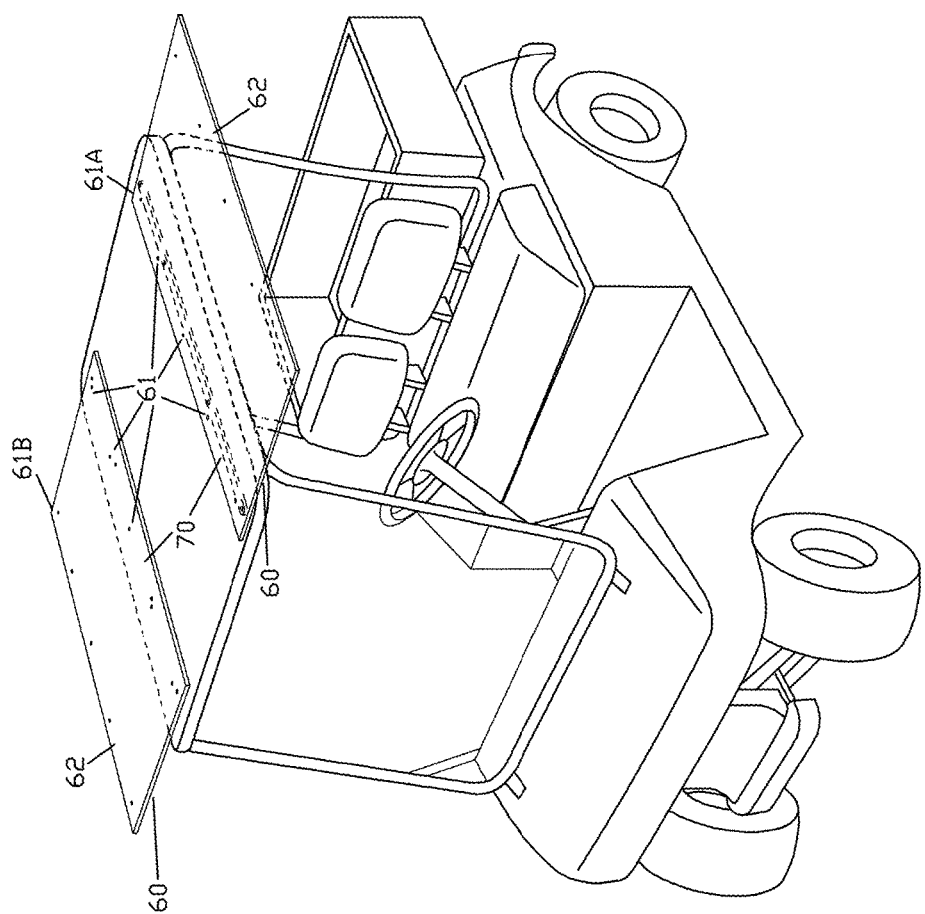
FIG. 12 is a perspective view of an alternate retractable and flexible embodiment of the device in the fully extended or deployed position having collapsible ribs in which the panels are semi-permanently attached to a golf cart.

In reference to FIG. 12, an alternate embodiment of the device is shown comprising two main support bars 70 semi-permanently attached to the golf cart roof near the left and right side edges of the golf cart's roof and two shield panels 60 comprising a flexible material covering a plurality of rigid ribs 61; said plurality of rigid ribs 61 having an interior or proximal side 61A and an exterior or distal side 61B. The interior side 61A of each of the plurality of rigid ribs 61 is attached to the main support bar 70. The exterior side 61B of each of the plurality of rigid ribs 61 extends away from the sides of the golf cart when the shield panel 60 is in the extended position; and the exterior side 61B of each of the plurality of rigid ribs 61 is attached to a perimeter support rod 62. Each of the rigid rib elements are connected to the main support bars 70 and the perimeter support rod 62 using swivel pin joints that allow them to rotate relative to each other. A flexible and opaque fabric overlay material is secured over the rib array to provide the rain and sun shield. In another embodiment the flexible and opaque fabric overlay material is secured over the rigid ribs 61 the perimeter support rod 62 and the main support bar 70.

Figure 13:
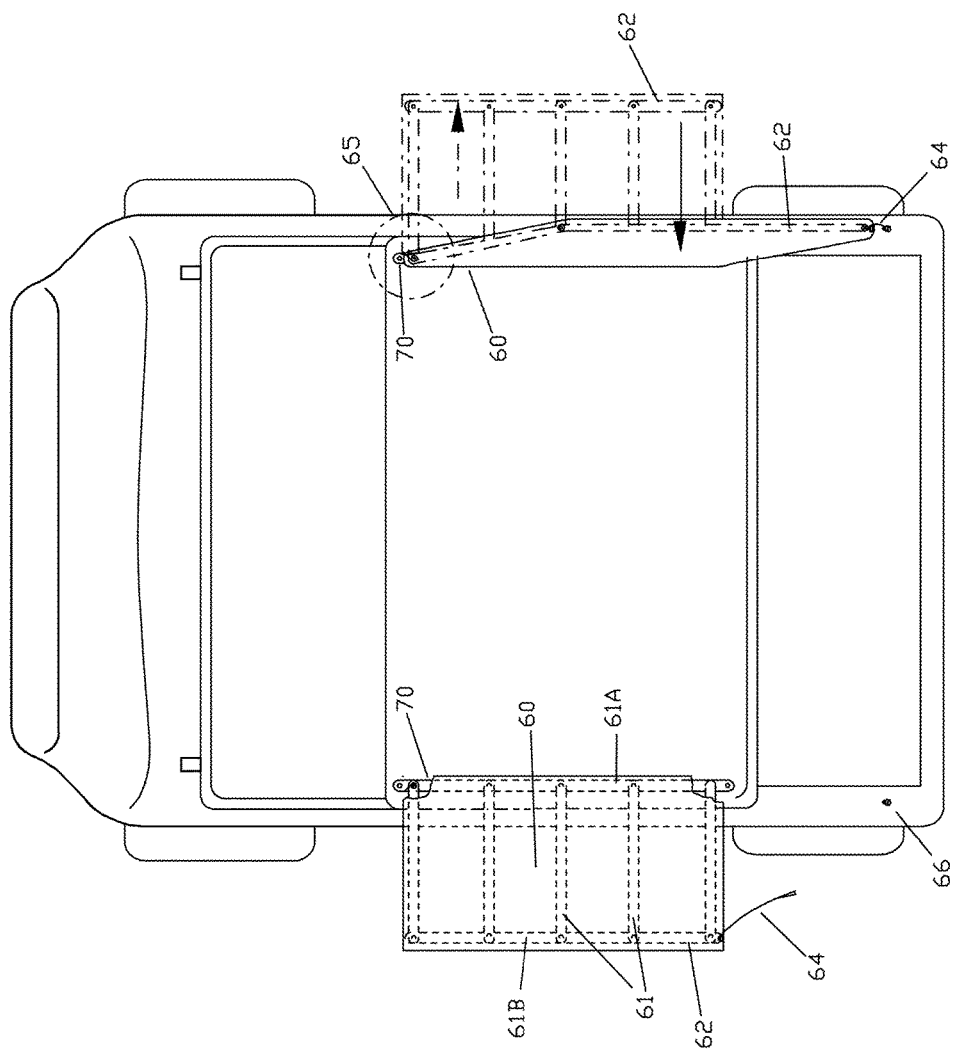
FIG. 13 is a top plan view of the embodiment of FIG. 12 showing one side in the fully extended position and the other side in a horizontally flexed and closed position with dashed lines showing that side's deployed position when not being horizontally flexed by an external force. This drawing also shows a dashed circle callout around one of the swivel hinges of one side that is showing in an exploded view in FIG. 14.

In reference to FIG. 13, the right-side shield panel 60 is shown in the retracted position in solid line and the extended position in dashed line. In the retracted position, the perimeter support rod 62 is pulled toward the back of the golf cart such that the shield panel 60 is collapsed within the roof line of the golf cart. Alternatively, this embodiment can be retracted when the perimeter support rod 62 is pulled toward the front of the golf cart by exactly the same mechanism. A semi-detachable strap 64 having two ends is permanently attached on one end to the rear edge of each panel 60 and on the other "free" end can be temporarily attached to an anchor point 66 on the rear of the golf cart frame to hold the panel 60 in the retracted position when the device is not being used. In another embodiment the removable strap 64 having two ends is permanently attached on one end to the front edge of each panel 60 and on the other free end temporarily attached to an anchor point 66 on the front of the golf cart frame to hold the panel 60 in the retracted position when the device is not being used. The anchor point 66 can be a fastener such as but not limited to a loop, hook, snap, Velcro, buckles, side release buckles, magnetic release buckles, cams, cam buckles, strap adjusters, center release buckles, breakaway buckles, ratchets, ratchet joints, snaps, rivets, and clasps that allows the strap to attach to the anchor point.

In one embodiment, the free end of one strap 64 has both hook and loop Velcro portions on it and the end of the Velcro strap 64 passes through a looped end of the non-Velcro strap 64 on the opposite panel. The Velcro strap 64 then folds on itself, fastened by the Velcro so that the two straps can also remain firmly attached to one another on top of the roof of the golf cart when the device is not in use. In another embodiment, any suitable fastener can be used to attach the free ends of the straps 64 on top of the golf cart roof. Once again, suitable fasteners can be buckles, side release buckles, magnetic release buckles, cams, cam buckles, strap adjusters, center release buckles, breakaway buckles, ratchets, ratchet joints, snaps, rivets, and clasps. In another embodiment (not shown), a strap having a looped end or other suitable fastener wraps under the golf cart roof and attaches to a hook or other corresponding fastener to hold the device securely to the golf cart roof.

A rotatable compression spring 65 is attached to the front or back swivel pin joint of the proximal also called interior side 61A of the plurality of rigid ribs 61. When the device is retracted, and one end of the strap is anchored to the front or rear of the cart, the spring 65 is compressed by the rotation of the swivel joint to which it is attached. When the strap is detached from the anchor, the compression spring releases the stored force and stretches rib array and flexible overlay material out into the extended position. In the embodiment of FIG. 13, a single rotatable compression spring is shown attached to the front swivel pin joint of the internal rib. However, in other embodiments, a plurality of compression springs can be placed on other swivel pin joints in the rib array to provide additional forces to automatically extend the shield into position for use. Another benefit of the compression springs placed on the swivel pin joints is realized when the extended shield contacts external forces during motion of the golf cart. For example, if the shield contacts a low-hanging tree branch or the side of a tunnel, the shield will deflect toward the front or rear of the cart depending on the direction of the pressure and then automatically return to the extended position when the cart clears the obstruction. In other words, the compression springs 65 are at rest when the panels 60 are fully deployed and the rigid ribs 61 are in a configuration perpendicular to the main support bar 70 and the perimeter support rods.

Figure 14:
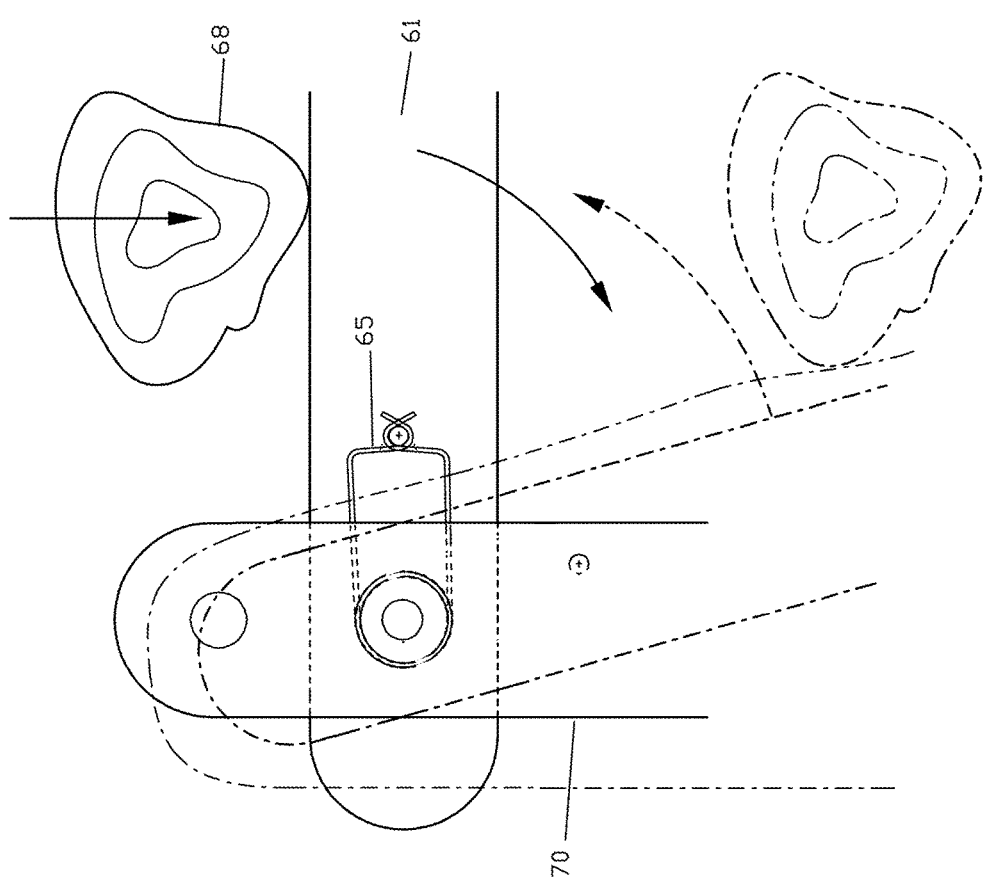
FIG. 14 is a top detail view of the dashed circle callout of FIG. 13 showing one of the swivel joints in solid lines at its open position and in dashed lines showing how the embodiment rotates when subjected to an external force and where a spring around the rotatable joint automatically returns the embodiment to the normally extended position when the external force is removed or is closed.

In reference to FIG. 14, an exploded view of one of the swivel pin joints of FIG. 13 is shown. In the extended position, the plurality of rigid ribs 61 is perpendicular to the main support bar 70 and the perimeter support rod 62. An external obstruction 68, which represents an immovable object that contacts the shield during motion of the cart such as but limited to brushing up against a tree or the side of a building or even a person, causes each of the plurality of ribs 61 to rotate about the swivel pin joint. One end of the compression spring 65 is anchored to the main support rod 70. The other end of the compression spring is attached to the swivel pin joint on at least one of the plurality of rigid ribs. As the rib rotates, a compressive force is stored in the spring. The deflected cross rib is shown in dashed line as it is rotated about the swivel pin joint. Once the cart passes the obstruction 68, the torsional force stored in the compression spring returns the cross rib to the perpendicular orientation.

Figure 15:
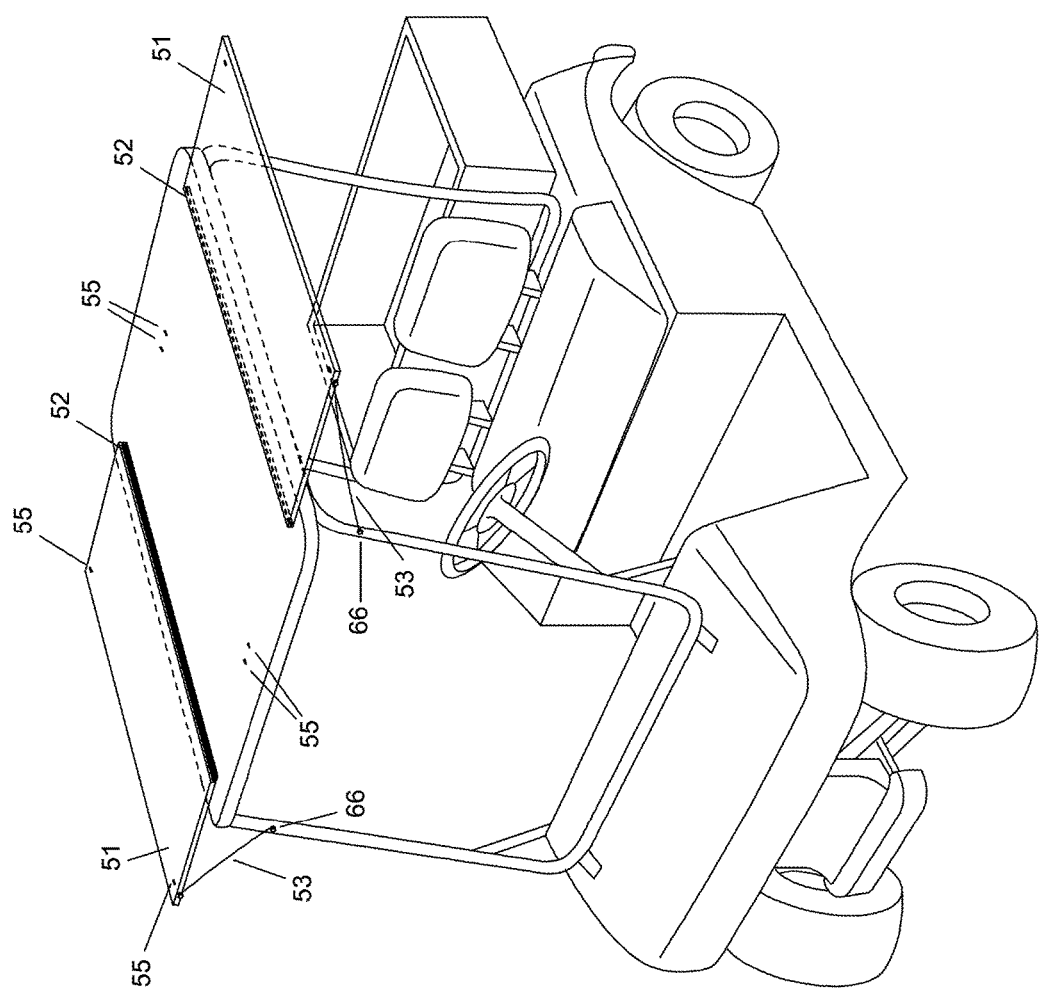
FIG. 15 is a perspective view of FIG. 10, an alternate embodiment of a folding embodiment of the device semi-permanently attached to a golf cart using a 180-degree rotating hinge that is semi-permanently attached on one side directly to the roof of the golf cart and to the shade panel on the other side with matching clasp elements for holding the panels in place on top of the golf cart roof when the panels are not in use.

In reference to FIG. 15, a perspective view of a folding embodiment of FIG. 10 is shown wherein 180-degree hinges 52 having two sides are on one side directly and semi-permanently attached to the roof of the golf cart and on the other side are attached to the proximal side of each panel 51. In this embodiment, one or more matching clasp elements 55 are shown placed near the front and/or rear edges of each shield panel that fold into receiving clasps secured toward the front and/or rear of the cart roof such that the panels are held in place on top of the golf cart roof when not in use. The clasp elements may be mechanical, magnetic or other such styles known in the art. The number and locations of the securing clasps required to provide the desired level of panel security when stowed will depend on factors such as the weight and dimensions of the shield panels and the profile of the golf cart's roof.

In reference to FIG. 16, a top view of the flexible embodiment of FIG. 13 is shown with an alternate means of stowage and deployment of the shield panels. The left shield panel is shown deployed in solid line while the right shield panel is shown stowed in solid line. The dashed lines for each panel show their opposite position. A long piano hinge or a plurality of smaller 180-degree rotating hinges is semi-permanently attached on one side to the roof of the golf cart. The other side of the hinge is attached to the lower surface of each support bar 70. In the retracted position, the shield panel folds about 180-degrees over the hinges 72 toward the central part of the top surface of the golf cart's roof. A semi-detachable retaining line 64 is permanently attached on one end to the rear edge of each shield panel. The other "free" end of the retaining line 64 is attached to an anchor pin secured to the rear frames of the cart at some distance below the cart's roof section when the panels are in use. The semi-detachable retaining line 64 could also be located toward the front edge of the shield panels and attached to a second anchor pin secured to the front frame section of the golf cart. Alternatively, the shield panels could be secured to both the front and rear frames simultaneously using multiple semi-detachable retaining lines 64 and anchor pins or clasps as previously described. In one embodiment, each panel has an anchor point so that the lengths of the retaining lines 64 are such that when in the stowed position, each free end is affixed to a corresponding anchor point on the other panel, securing the panels together. Alternatively the semi-detachable lines 64 can attach together at their free end when in the stowed or closed positon. In one embodiment, grommets 34 (as shown in FIG. 11) are placed on the panels where they come in contact with the golf cart roof to prevent the panels from having direct contact with the golf cart roof. This will prevent damaging the golf cart roof.

While various embodiments of the present invention have been described above, it should be understood that they have been presented by way of example only, and not of limitation. Likewise, the various diagrams may depict an example architectural or other configuration for the invention, which is provided to aid in understanding the features and functionality that can be included in the invention. The invention is not restricted to the illustrated example architectures or configurations, but the desired features can be implemented using a variety of alternative architectures and configurations.

Indeed, it will be apparent to one of skill in the art how alternative functional configurations can be implemented to implement the desired features of the present invention. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

What is claimed is:

1. A rain and sun shield device comprising:
   a pair of main support bars having a lower surface, an upper surface, a right side, and a left side, wherein each of the pair of main support bars is attached to at least one 180-degree hinge having an upper and lower surface and a proximal and distal edge;
   said lower surface of the distal edge of each 180-degree hinge is attached to the lower surface of one of the pair of main support bars and said proximal edge of each 180-degree hinge is semi-permanently attached to a golf cart roof, said roof having a top, an underside, a front, a back, a left and a right side edge;
   one of each of said pair of hinges is attached to the golf cart roof near the right side edge of the golf cart roof top;
   the other of each said pair of hinges is attached to the golf cart roof near the left side edge of the golf cart roof top;
   a pair of perimeter support rods having a top edge, a bottom edge, a forward edge and a rear edge;
   a plurality of rigid ribs each having a top edge, an interior end attached to the one of the pair of support bars and an exterior end attached to one of the pair of perimeter support rods;
   a plurality of rotatable swivel pin joints located at each attachment point of the rigid ribs to one of the pair of support bars and one of the pair of perimeter support rods whereby the rigid ribs can rotate relative to each other;
   a flexible, water-proof and opaque material covering the plurality of rigid ribs to form a pair of panels having a top and bottom surface and a front, rear, left and right side edge;
   wherein the deployed panels extend beyond the right and left side of the golf cart roof; and whereby said each pair of hinges the panels unfold about 180 degrees to lay the panels partly on the golf cart roof and also extend beyond the right and left side edges of the golf cart roof.

2. The device of claim 1, further comprising at least one compression spring attached to at least one swivel pin joint on the interior side of at least one rigid rib at the attachment point of the rigid rib to each support bar whereby the plurality of rigid ribs extend perpendicular to each support bar and perimeter support rod when the panels are fully deployed and the spring is at rest.

3. The device of claim 1, further comprising: a golf cart frame to which the golf cart roof is attached; and at least one pair of semi-detachable straps each having two ends, whereby one end is attached to the rear edge of the each panel and the other end is attached to the rear of each golf cart frame below the cart roof whereby said straps each panel is held in a retracted position against the golf cart when the device is not in use.

4. The device of claim 1, further comprising: a golf cart frame to which the golf cart roof is attached; and at least one pair of semi-detachable straps each having two ends, whereby one end is attached to the front edge of the each panel and the other end is attached to the front of each golf cart frame below the cart roof whereby said straps each panel is held in a retracted position against the golf cart when the device is not in use.

5. The device of claim 1, wherein the deployed panels lie partly on the golf cart roof and also extend beyond the right and left sides of the golf cart roof by up to about 24 inches.

6. The device of claim 1, further comprising a clasp attached to the top front edge of the golf cart roof and a mating clasp attached to the front edge of each panel.

7. The device of claim 1, further comprising a clasp attached to the top rear edge of the golf cart roof and a mating clasp attached to the rear edge of each panel.

8. The device of claim 1, wherein the 180-degree hinge is semi-permanently attached to the golf cart roof using a mechanical fastener comprising screws or bolts.

* * * * *